3,829,482
PRODUCTION OF N-(1-ALKEN-1-YL)-CARBAMYL CHLORIDES
Albrecht Mueller, Frankenthal, Bernd Zeeh, Ludwigshafen, and Hans Kiefer, Wachenheim, Germany, assignors to Badische Anilin- & Soda-Fabrik Aktiengesellschaft, Ludwigshafen (Rhine), Germany
No Drawing. Filed Nov. 5, 1971, Ser. No. 196,181
Int. Cl. C07c 103/30
U.S. Cl. 260—544 C                    1 Claim

ABSTRACT OF THE DISCLOSURE

Production of N-(1-alken-1-yl)-carbamyl chlorides by reaction of imidoacid esters with phosgene and the new N-(1-alken - 1 - yl)-carbamyl chlorides themselves. The products are starting materials for the production of plant protection agents, coating intermediates and plastics.

---

The invention relates to a process for the production of N-(1-alken-1-yl)-carbamyl chlorides by reaction of an imido acid ester with phosgene.

It is known from Am. Chem. J. 19, 129 (1897), and 20, 64 (1898), that N-substituted aromatic imino esters can be reacted with acetyl chloride to form N-acyl derivatives of the corresponding acid amides. An article in Helv. Chem. Act., 48, 1805 (1965) describes the reaction of N-methylcaprolactam ether to N-acylcaprolactam. Symmetrical bis-(2-chloroethyl)-diacylureas are obtained in the reaction of 2-oxazolines with phosgen (Angew. Chem., 78, 913 (1966).

It is an object of this invention to provide a new process for producing a large number of N-(1-alken-1-yl) - carbamyl chlorides in a simple manner and in good yields and high purity.

Another object of this invention is the new N-(1-alken-1-yl)-carbamyl chlorides themselves.

We have found that N-(1-alken-1-yl)-carbamyl chlorides of the general formula:

(I)

in which the individual radicals $R^1$, $R^2$ and $R^3$ may be identical or different and each denotes an aliphatic, cycloaliphatic, araliphatic or aromatic radical and moreover the individual radicals $R^3$ may each denote a hydrogen atom, are obtained advantageously by reacting an acid imino ester of the general formula:

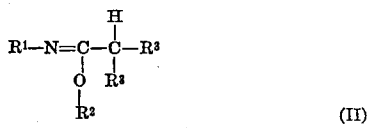

(II)

in which the radicals $R^1$, $R^2$ and $R^3$ have the meanings given above with phosgene.

The reaction may be represented as follows when the methyl ester of N-methylacet imidic acid is used:

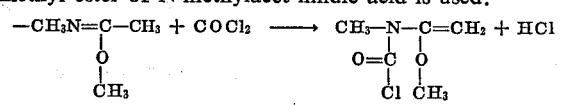

Having regard to the prior art, the process of the invention gives a large number of new N-(1-alken-1-yl)-carbamyl chlorides in good yields and high purity by a simple method.

The imino esters used as starting materials (II) may be prepared by any method, for example one of the methods in the said publications or in Berichte der Deutschen Chemischen Gesellschaft, volume 98, pp. 2754 et seq. (1965). The starting material may be reacted with phosgene in stoichiometric proportions or in excess, for example in a ratio of from 1 mole of 1.2 moles of phosgene for each mole of starting materiall (II).

Preferred starting materials (II) and thus preferred products (I) are those in whose formulae the individual radicals $R^1$, $R^2$ and $R^3$ are identical or different and each denotes alkyl of one to four carbon atoms, cycloalkyl of 5 or 6 carbon atoms, aralkyl of seven to twelve carbon atoms, phenyl or naphthyl and moreover the individual radicals $R^3$ may denote hydrogen atoms. The said radicals may also bear as substituents, groups and/or atoms which are inert under the reaction conditions, for example chlorine atoms, bromine atoms, fluorine atoms, trifluoro groups, alkyl groups, alkoxy groups, alkylthio groups, acetoxy groups, and alklsulfonyl groups, in each case of 1 to 4 carbon atoms, or nitro groups.

The following acid imino esters are examples of suitable starting materials (II): the methyl, ethyl, propyl, allyl, isopropyl, 1-methoxyropyl-(2), n-butyl, sec.-butyl, tert.-butyl, cyclopentyl, 1-methylcyclopentyl, cyclohexyl, cyclooctyl, benzyl, phenyl, o-toluyl, m-toluyl, p-toluyl, m-chlorophenyl, p-chlorophenyl, p-bromophenyl or 2,6-diethylphenyl esters of acetimidic acid bearing (as substituents on the nitrogen atom) an isopropyl, cyclohexyl, n-propyl, benzyl, methyl, ethyl, n-propyl, n-butyl, tert.-butyl, 2-ethylhexyl, 1-octadecyl, cyclooctyl, o-toluyl, m-toluyl, p-toluyl, o-bromophenyl, o-chlorophenyl, 3,4-dichlorophenyl, m-methylsulfonylphenyl, p-chlorophenoxyphenyl, p-fluorophenyl, p-bromophenyl, p-chlorophenyl, 2-methoxyisopropyl, sec.-butyl, tert.-amyl, cyclopentyl, phenyl, m-trifluoromethylphenyl, o-trifluoromethylphenyl, 4-methoxy-3-chlorophenyl, 4 - methyl-3-chlorophenyl, o,o'-diethylphenyl or o,o'-dimethylphenyl groups; and analogous propionic, butyric, isobutyric, 2-methylvaleric, diphenylacetic, dibenzylacetic, α-ethyl-β-phenylpropionic, cyclohexylacetic, naphthylacetic, cyclopentylacetic or β-phenylpropionic imino esters.

The reaction is advantageously carried out in the presence of a base, advantageously in the presence of a tertiary amine, in an amount of from 1 to 1.5 moles per mole of starting material (II). Examples of suitable bases are tertiary amines such as triethylamine, pyridine, quinoline, ethyldicyclohexylamine, dimethylcyclohexylamine, or 1,4-diazabicyclo[2,2,2]octane; and alkali metal carbonates such as potassium or sodium carbonate.

The reaction is advantageously carried out at a temperature of from —20° to +20° C., preferably at from 0° to 100° C., at atmospheric or superatmospheric pressure, continuously or batchwise. Organic solvents which are inert under the reaction conditions may be used such as aromatic hydrocarbons, for example benzene or toluene; chlorohydrocarbons, for example carbon tetrachloride or trichloroethylene; ethers, for example diethyl ether or dioxane; alicyclic hydrocarbons, for example cyclohexane; or mixtures of the same.

The reaction may be carried out as follows: phosgene is passed over one to three hours at the reaction temperature into starting material (II), if desired mixed with base and/or solvent. Phosgene together with a solvent may also be placed in a vessel to which base and starting material (II), with or without solvent, is added. Furthermore a mixture of all the components except the base may be prepared in the manner described, and then the mixture may be added to the base or the base added to the mixture. It is advantageous to stir the mixture for another half hour to four hours after all the components have been added. Unreacted phosgene is then removed from the mixture, for example by passing in a stream of nitrogen, and the mixture is filtered. The filter cake, which is mainly the hydrochloride of the amine formed during the reaction, is washed with one of the abovementioned solvents. The filtrates obtained are united and the product is isolated therefrom by a conventional method, for example by fractional distillation.

The new compounds which can be prepared by the process of the invention are valuable starting materials for the production of plant protection agents, coating intermediates and plastics. They are suitable for the production of insecticidal phenylcarbamic esters, for example N-methyl-N-1'-methoxyvinyl-7-benzo-2,2-dimethyl-2,3-dihydrofuranyl carbamate. Reference is made to German Patent (patent application P 20 54 659.2) for details of other uses.

αhe end products may be polymerized by free radical or ionic polymerization, or copolymerized with other monomers, for example acrylic esters, methacrylic esters or styrene. Copolymers with ethylene, butadiene, styrene and acrylic esters of methanol, ethanol, propanol, butanol and ethylcyclohexanol in an amount of from 0.1 to 50%, preferably from 1 to 25%, by weight based on the copolymer are of particular industrial interest. Conventional free radical generating initiators such as dibenzoyl peroxide, ditert.-butyl peroxide or azodiisobutyronitrile may be used to initiate the polymerization. Reference is made to Houben-Weyl, "Methoden der organischen Chemie," volume 14/1 (1969), page 24, concerning copolymerization.

The copolymers may be used as coatings or films on building materials, for example wood, stone or concrete surfaces. The production of such coatings or films may be carried out by any conventional method (Ullmanns Encyklopädie der technischen Chemie, volume 11, (1960), pages 283, 367 et seq.). Crosslinking agents for polyamides may be prepared from the end products by polymerization. Crosslinking of polyamines may be carried out for example by methods described in the said volume of Houben-Weyl. The polymers may also be used for the production of moldings or adhesives.

Specific preferred end products are:
N-methyl-N-α-methoxyvinylcarbamyl chloride,
N-methyl-N-α-ethoxyvinylcarbamyl chloride,
N-methyl-N-α-isopropoxyvinylcarbamyl chloride,
N-ethyl-N-α-methoxyvinylcarbamyl chloride,
N-tert.-butyl-N-α-methoxyvinylcarbamyl chloride,
N-isobutyl-N-α-methoxyvinylcarbamyl chloride,
N-ethyl-N-α-ethoxyvinylcarbamyl chloride,
N-propyl-N-α-methoxyvinylcarbamyl chloride,
N-methyl-N-α-isopropoxyvinylcarbamyl chloride,
N-methyl-N-α-tert.butoxyvinylcarbamyl chloride,
N-methyl-N-α-methoxyisobutenylcarbamyl chloride,
N-methyl-α-methoxypropenylcarbamyl chloride,
N-4-fluorophenyl-α-ethoxyvinylcarbamyl chloride,
N-3-trifluoromethylphenyl-α-ethoxyvinylcarbamyl chloride,
N-3,4-dichlorophenyl-α-ethoxyvinylcarbamyl chloride,
N-4-chlorophenyl-α-ethoxyvinylcarbamyl chloride and
N-methyl-α-phenoxyvinylcarbamyl chloride.

The following Examples illustrate the invention.

EXAMPLE 1

195 parts of phosgene is passed into a solution of 157 parts of the methyl ester of N-methylacetimic acid and 376 parts of ethyl dicyclohexylamine in 600 parts of benzene in the course of two hours at 0° to 10° C. The mixture is stirred for another hour at 0° to 10° C. The mixture is stirred for another hour at 0° to 10° C. The excess phosgene is driven out with nitrogen. The precipitate is suction filtered and washed with benzene. The combined filtrates are concentrated in vacuo and the residue is fractionated in vacuo.

239 parts (89% of theory) of N-methyl-N-α-methoxyvinylcarbamyl chloride is obtained having a boiling point of 49° C. at 1.5 mm.

EXAMPLE 2

7 parts of phosgene is introduced into a solution of 13 parts of N-3-trifluoromethylphenylacetimidic acid ethyl ester and 8 parts of triethylamine in 50 parts of dioxane at 5° to 15° C. The mixture is stirred for thirty minutes at room temperature and the precipitate is filtered off and washed with dioxane. The combined filtrates are concentrated and the residue is fractionated in vacuo. 12.3 parts of N-3-trifluoromethylphenyl-N-α-ethoxyvinylcarbamyl chloride is obtained (75% of theory) and has a boiling point of 106° C.

EXAMPLE 3

142 parts (87% of theory) of N-ethyl-N-α-methoxyvinylcarbamyl chloride having a boiling point of 48° C. at 0.7 mm. is obtained from 101 parts of N-ethylacetimidic acid methyl ester as described in Example 1.

EXAMPLE 4

89.9 parts (88% of theory) of N-methyl-α-ethoxyvinyl carbamyl chloride having a boiling point of 45° C. at 0.5 mm. is obtained from 63 parts of N-methylacetimidic acid ethyl ester as described in Example 1.

EXAMPLE 5

24 parts (50% of theory) of N-(4-fluorophenyl)-α-ethoxyvinylcarbamyl chloride is obtained as described in Example 1 from 36 parts of the ethyl ester of N-(4-fluorophenyl)-acetimidic acid; it has a boiling point of 117° to 119° C. at 0.2 mm.

EXAMPLE 6

22.6 parts (50% of theory) of N-phenyl-α-ethoxyvinylcarbamyl chloride having a boiling point of 118° to 120° C. is obtained from 32 parts of N-phenylacetimidic acid ethyl ester analogously to Example 1.

We claim:
1. An N-(1-alken-1-yl)-carbamyl chloride of the formula

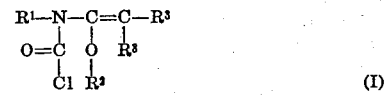

(I)

wherein the individual radicals $R^1$, $R^2$ and $R^3$ are identical or different and each denotes alkyl of one to four carbons, cycloalkyl of 5 or 6 carbons, aralkyl of seven to twelve carbons, phenyl or naphthyl and moreover the individual radicals $R^3$ may denote hydrogen atoms, said radicals being either unsubstituted or bearing a substituent of the group consisting of chlorine, bromine, fluorine, trifluoro, alkyl, alkoxy, alkylthio, acetoxy and alkylsulfonyl groups, in each case of 1 to 4 carbons and nitro.

References Cited

UNITED STATES PATENTS 3,501,523  3/1970  Soyigh et al. _____ 260—544 C

FOREIGN PATENTS 1,157,210  11/1963  West Germany ____ 260—544 C
744,409    7/1970   Belgium _____ 260—544 C

OTHER REFERENCES

Breedeweld Rec. Trav. Chem. Pays-Bas (1960) pp. 1197–1202.

LORRAINE A. WEINBERGER, Primary Examiner

R. D. KELLY, Assistant Examiner

U.S. Cl. X.R.

260—77.5 R, 346.2 R, 479 C, 482 C

UNITED STATES PATENT AND TRADEMARK OFFICE
CERTIFICATE OF CORRECTION

PATENT NO. : 3,829,482
DATED : August 13, 1974
INVENTOR(S) : Albrecht Mueller, Bernd Zeeh, and Hans Kiefer It is certified that error appears in the above-identified patent and that said Letters Patent are hereby corrected as shown below:

Column 1, in the heading, insert --Claims priority, Application German, November 6, 1970, P 20 54 660.5--;

Column 2, line 4, delete "materiall" and substitute --material--;

Column 3, line 13, delete "xhe" and substitute

Signed and Sealed this ninth Day of December 1975

[SEAL]

Attest:

RUTH C. MASON
Attesting Officer

C. MARSHALL DANN
Commissioner of Patents and Trademarks